Feb. 4, 1930.  E. G. PARVIN  1,745,503
RECIPROCATING ELECTRIC MOTOR
Filed Aug. 24, 1925  2 Sheets-Sheet 1
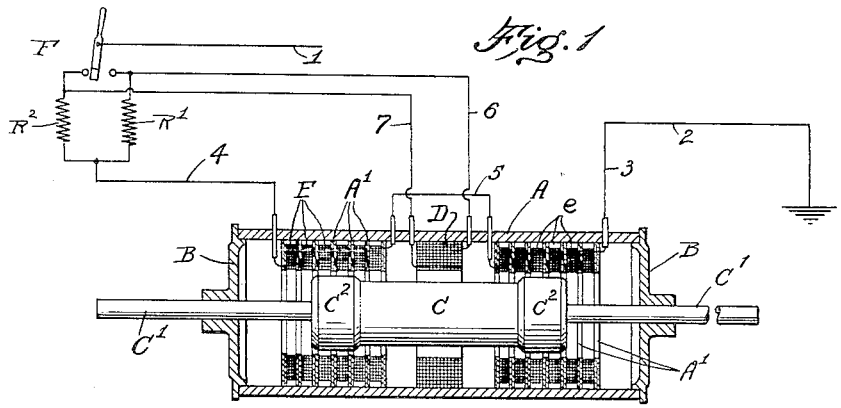
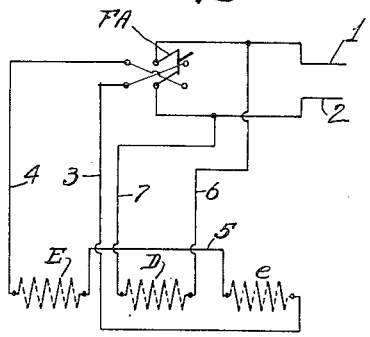
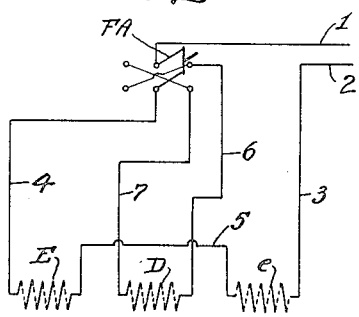
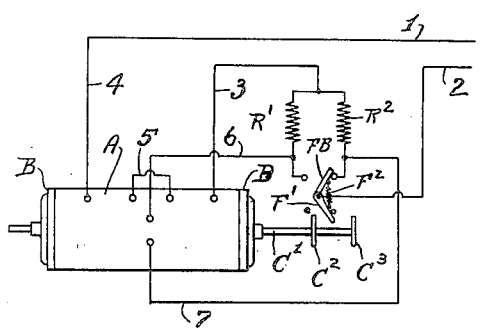
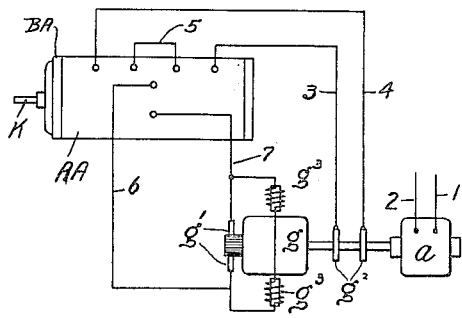
INVENTOR
Edward G. Parvin
BY
John E. Hubbell
ATTORNEY

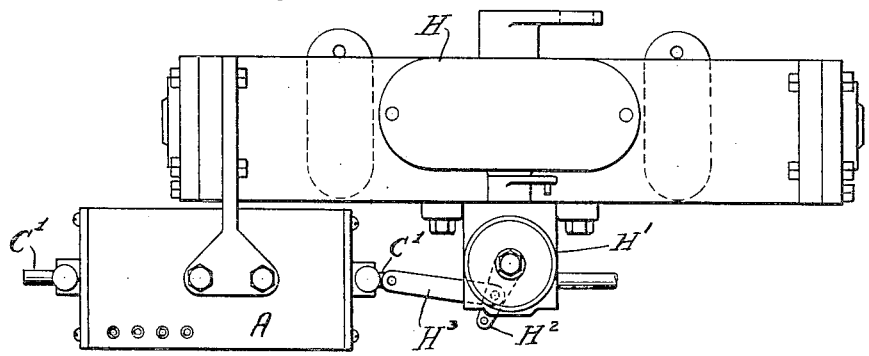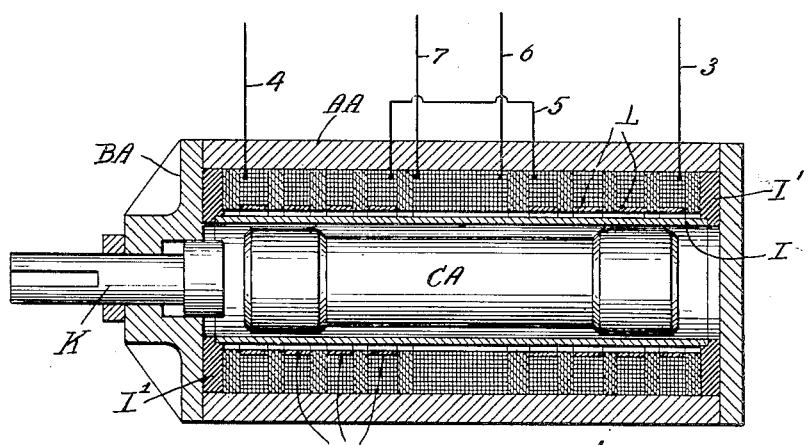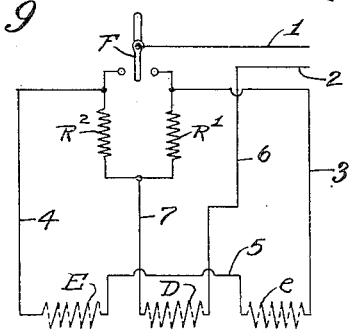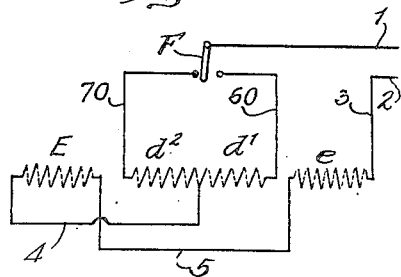

Patented Feb. 4, 1930

1,745,503

UNITED STATES PATENT OFFICE

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK

RECIPROCATING ELECTRIC MOTOR

Application filed August 24, 1925. Serial No. 51,975.

The primary object of my present invention is to provide an improved reciprocating electric motor characterized by its simple and effective mechanical construction, and by the simplicity and effectiveness of the provisions made for securing the necessary electromagnetic inter-action between the stationary and moving elements of the motor. A more specific object of the invention is to provide improved means for reversing the direction of movement of the moving element of the motor, and in some cases for effecting such reversal automatically to thereby adapt the motor to use as an electric hammer or for analogous purposes.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is a sectional elevation of one form of motor with circuit connections for reversibly energizing the motor shown diagrammatically;

Fig. 2 is a diagram illustrating a modification of the circuit arrangement of Fig. 1;

Fig. 3 is a diagram illustrating a second modification of the circuit arrangement of Fig. 1;

Fig. 4 is a view showing a modification of the apparatus shown in Fig. 1, which comprises automatic motor reversing means;

Fig. 5 is a diagrammatic representation of a modification of the apparatus shown in Fig. 1, comprising a motor generator for energizing the motor;

Fig. 6 is a plan view of a fluid pressure motor with a valve mechanism actuated by the improved motor;

Fig. 7 is a sectional elevation of a modified form of the improved motor;

Fig. 8 is a diagram illustrating another form of circuit arrangement; and

Fig. 9 is a diagram illustrating still another form of circuit arrangement.

In the drawings and referring first to the construction shown in Fig. 1, the motor shown comprises a barrel like or cylindrical structure A of magnetic material provided with end members B formed with bearings for shaft-like extensions of the moving element C of the motor. Mounted in the barrel A midway between its ends is a stationary winding D which I call the field winding of the motor and also mounted in the barrel A one at each end of the field winding D are stationary winding sections or coils E and $e$ which constitute what I call the armature winding of the motor. The coils D, E, and $e$, are co-axial with the movable element C which they surround. The element C is a body of metal having good magnetic properties and may well be a steel forging. The element C, as shown, is circular in cross section with enlarged polar end portions $C^2$ connected by a body portion of smaller cross section. Advantageously, the axial length of each polar portion $C^2$ is less than the axial length of the surrounding winding section E or $e$, while the axial length of the reduced body portion is gerater than that of the winding D, and as shown, the length of the element C may well be approximately equal to the distance between corresponding ends of the two coils E and $e$, so that in the neutral position of the element C shown in Fig. 1 the center of one polar portion $C^2$ will be midway between the ends of the winding section $e$, and the center of the other polar portion will be midway between the ends of the winding section E. Advantageously, and as shown, each of the winding sections E and $e$ is divided into a series of end to end sections with adjacent sections of each winding separated by annular bodies A' of magnetic material forming internal circumferential rib-like projections of the magnetic shell A. The bodies A' are advantageously laminated and may well be formed of annular punchings similar to those employed in ordinary motor armature cores.

As shown in Fig. 1, the motor is energized from supply conductors 1 and 2 by connections including a conductor 3 running to the supply conductor 2 from one terminal of the armature winding section e, a conductor 5 connecting the second terminal of the armature winding section e to one terminal of the winding section E, a conductor 4 connecting the other terminal of the winding section E to one terminal of each of two resistances R' and R², and a reversing switch F by which the second terminal of either one or the other of the resistances R' and R² may be directly connected to the supply conductor 1. The terminals of the motor field winding D are connected by conductors 6 and 7 to the terminals of the resistances R' and R² remote from the conductor 4. When the reversing switch F of Fig. 1 is directly connected to one terminal of the resistance R², for example, the current flows in series through the winding sections E and e and conductors 3, 5, and 4, divides, in passing between the switch F and the conductor 4, into two circuits one of which includes the resistance R² and the other of which includes the resistance R', the conductor 6, the field winding D, and the conductor 7. When the switch F is adjusted to directly engage the corresponding terminal of the resistance R', the strength of the current flow through the winding D and winding sections E, and e, will be the same as before if the resistances R' and R² are equal, as they should be when the force exerted by the element C is to be the same with each direction of movement. The shifting of the switch F from direct engagement with one terminal of the resistance R² into direct engagement with one terminal of the resistance R' does not change the direction of current flow through the winding sections E and e, but does change the direction of current flow through the coil D and thereby reverses the movement of the motor element C.

The winding sections E and e are so wound or connected that at any one instant the direction of current flow about the motor axis in one of these winding sections will be the same direction, and in the other of the sections will be opposite in direction to that in the winding D. In consequence the interaction between the magnetic field created by the winding D and the energized conductors forming each of the winding sections E and e tends to move the member C toward the end of the motor at which is located the winding section E or e in which, at the instant, the direction of current flow about the axis is the same as in the winding D. The magnetic inter-action between the stationary and moving elements of the improved motor is analogous to that which takes place in an ordinary direct current motor, in that the magnetic lines of force set up by the motor field winding, co-act with lines of force created by the current flow through the armature winding and tend to cause a relative movement of the conductors forming the armature winding across the magnetic lines of force created by the field winding. In my improved motor, just as in an ordinary rotating motor, the movement of the movable motor element creates a counter-electromotive force in the armature winding sections reducing the current flow through the latter, and also in the motor field winding when the latter is in series with the armature windings as in the arrangement shown in Fig. 1.

My improved motor is obviously adapted for many different uses. The form of motor and the circuit arrangement shown in Fig. 1, were primarily devised for use in operating the reversing valve of a fluid pressure motor employed to open and close the doors of elevated and subway trains. In Fig. 6, H represents such a fluid pressure motor, and H' the oscillating reversing valve therefor, the valve H' being provided with an arm H² connected by the connecting rod H³ to one end of the shaft extension C' of the moving element C of the motor. For such use the supply conductor 1, may be the trolley wire or third rail of the power system, and the conductor 2 may be the ground connection of the power circuit. The circuit connection shown in Fig. 1 is especially suitable for the use just described because of the voltage drops occurring in the resistances R' and R², since the maximum voltage which it is ordinarily desirable to impress on the windings of the improved motor will be a fraction only of the available trolley or third rail voltage commonly employed for energizing the driving motors of the car on which the motor A is used. With the resistances R' and R² connected as shown, the voltage impresesd on the terminals of the armature windings E and e will be less than the voltage between the supply conductors 1 and 2 by an amount corresponding to the potential drop through the resistance R² or R' directly connected to the switch F, while the voltage impressed upon the field coil D will be less than the voltage drop in the resistance R² or R' directly connected to the switch F by an amount equal to the potential drop due to the flow of the field winding current through one or the other of the resistances R' and R².

In reversing the direction of motion of the movable element C of the motor, it is obviously immaterial whether this is done by reversing the direction of current flow through the field winding D as shown in Fig. 1, or is done by reversing the direction of flow through the armature winding sections E and e without changing the direction of flow through the field winding D as is shown with the circuit arrangement shown in Fig. 9, which differs in this respect only from the circuit arrangement of Fig. 1.

Where it is desirable to avoid the voltage drop and energy loss incident to the use of the resistances R' and R², those resistances and the simple reversing switch of Fig. 1, may be replaced by a double pole switch as shown in Fig. 2. In Fig. 2 the conductor 4 is connected to the supply conductor 1 through the field winding D and conductors 6 and 7 in either of the two operative positions of the double pole reversing switch FA, so that the flow through the armature winding sections is always in the same direction, but the shifting of the switch from one position to the other reverses the direction of flow through the field winding D.

In Figs. 1 and 2, the armature and field windings are in series, and the motor has many of the charactertistics of a direct current series motor. The motor armature and field windings may equally well be connected in parallel with one another as shown in Fig. 3, in which case the motor characteristics will be like those of an ordinary shunt wound motor rather than those of a series wound motor. In the particular arrangements shown in Fig. 3, the reversing switch FA in one position connects the armature winding terminal conductors 3 and 4 to the supply conductors 1 and 2, respectively, and in its second position the switch connects the conductors 3 and 4 to the supply conductors 2 and 1, respectively. As shown in Fig. 3, the field winding terminal connections 6 and 7 are directly connected to the supply conductors 1 and 2 respectively, and the current flow through the field winding D is not dependent on the position of the reversing switch FA. It will be obvious, however, that by the use of a special reversing switch, or by the use of a supplemental switch it is possible to open the circuit including the field winding D when that winding does not need to be energized.

With the motor shown in Fig. 1, the element C will move in one direction only for any given position of the switch F, and the latter must be manually adjusted to move the element C in the opposite direction. The motor, however, may readily be provided with means for automatically reversing the movement of the movable member C as is required to adapt the motor for use as an electric hammer, riveting device, or the like. For example, as shown in Fig. 4, an automatic reversing switch FB may be provided for actuation by the moving element C as it reaches or approaches each limit of its movement. The switch FB as diagrammatically shown in Fig. 4, comprises an actuating arm F' pivoted co-axially with the switch blade and connected to the latter by a spring F² so that when the arm F' is engaged by a collar C³ carried by the motor shaft extension C' as the latter moves to the left from the position shown in Fig. 4, the resultant movement of the arm F' will carry the line of action of the spring F² to the left of the pivotal connection between the switch blade and the arm F'. This causes the switch blade to snap over from the position shown in Fig 4 in which it engages the terminal connected to the resistances R², into the position in which it engages the terminal directly connected to the resistance R'. This reverses the direction of movement of the movable element, and as the latter approaches the right hand limit of its movement, the collar C² engages the arm F' and again carries the spring F² to the right of the pivotal connection between the arm F' and the switch blade, whereupon the latter is returned to the position shown in Fig. 4.

If the field winding and the armature winding of the motor are energized, one continuously by direct current, and the other by alternating current of proper frequency, the movable motor element will reciprocate with a frequency which is the same as that of the alternating current passing through one of the motor windings. In such case no reversing switch is required. In such use of a motor, the current frequency and the natural period of vibration of the element C should be suitably correlated, and in many cases, at least the frequency of the current, should be less than the frequency of ordinary commercial lighting and power circuits. In some cases when one of the motor windings is to be energized by alternating current, the motor AA may advantageously be combined with a motor generator as shown in Fig. 5, wherein a represents the motor member of the motor generator, and is energized from the conductors 1 and 2, which in this case may supply alternating current or direct current accordingly as the motor a is an alternating or direct current motor. The generator g driven by the motor a is provided with a commutator and brushes g' supplying direct current to the field winding terminal conductors 6 and 7 of the reciprocating motor AA, and with slip rings g² supplying alternating current at proper frequency to the armature winding terminals 3 and 4 of the motor AA. As shown in Fig. 5, the field windings g³ of the generator g are connected in shunt to the armature circuit of the generator. Except with the arrangement shown in Fig. 5, direct current energization of the various motor arrangements illustrated is ordinarily desirable, but all of the arrangements illustrated will operate when energized from a source of alternating current though, of course, with alternating current energization, it is desirable to properly laminate all metallic portions of the magnetic circuit.

When the motor AA is intended for use as an electric hammer, whether energized as shown in Fig. 4 or in Fig. 5, or in some alternative manner, the shaft extensions C may well be omitted from the movable element CA as shown in Fig. 7, and the latter may then be mounted in a suitable guide sleeve or tubular bearing I. As shown, the sleeve I is secured in place by recessed end rings or spiders I'. One of the end heads BA of the motor AA is formed with a suitable bearing for a tool holder K having an enlarged head against which the element CA strikes a hammer blow on each movement of the element to the left as seen in Fig. 7.

If and when it is desirable to limit the speed of the movable element C of the motor, this result may be accomplished by means of short circuited retarding conductors such as the circular conductors L shown in Fig. 7. The conductors L exert no retarding effect on the movement of the member C when the latter is stationary, but when the element C is in motion the current flow created in the conductors L creates an electromagnetic force opposing the motion of the element which increases with the speed of the element. Such short circuited conductors are especially useful when the motor is used as it may be for direct action on a car door to open and close the latter. In such use, the short circuited conductors L limit the maximum speed of movement of the movable element. They also reduce the force which that element can impart to the door when its motion is rapid, while they do not prevent the motor from exerting its maximum power in starting the door into motion at any point in the travel of the door.

The use of two alternately energized field winding sections makes it possible to reverse the motor by means of a simple reversing switch F and without requiring the use of the resistances R' and R². In the arrangement of this character shown in Fig. 8, $d'$ represents one of the two field winding sections, and $d^2$ the other. The two field winding sections $d'$ and $d^2$ each have one terminal connected to the armature winding terminal 4. The second terminal of the winding section $d'$ is connected by a conductor 60 to one contact of the switch F, and the second terminal of the winding section $d^2$ is connected by a conductor 70 to the second contact of the switch F. When the switch F connects the conductor 1 to the conductor 60, the winding section $d'$ is energized, and the winding section $d^2$ is de-energized, and when the switch connects the conductor 1 to the terminal 70 the winding section $d'$ is de-energized and the winding sections $d^2$ is energized. The winding sections $d'$ and $d^2$ are so arranged that the direction of the magnetic field created by the energization of one winding section is opposite to that created by the energization of the other. The reversal of the motor field polarity does not change the direction of current flow in the armature winding sections E and $e$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent is:

1. A reciprocating motor comprising a reciprocating body of magnetic material, a stationary body of magnetic material surrounding said reciprocating body, an armature winding carried by said stationary body comprising two axially separated sections, a field winding carried by said stationary body between the two sections of the armature winding, said body being of sufficient length that its ends may be simultaneously surounded by said winding sections adjacent the end of the motor, and means for energizing said windings to create current flows in opposite directions about said reciprocating body in the two sections of the armature winding and a current flow in the field winding which is alternately in the same direction as the current flow in one and then in the other of the two sections of the armature winding, comprising two resistances each connected at one end to one terminal of one of said windings, means for alternately connecting the opposite end of first one and then the other of said resistances to one side of a power circuit, a connection from the other side of said power circuit to the other terminal of the last mentioned winding, and means connecting the terminals of the other winding one to one and the other to the second of said resistances at the said opposite ends of the latter.

2. A reciprocating motor comprising a reciprocating body of magnetic material having enlarged polar portions and an intermediate body portion, a fixed armature winding surounding each of said polar portions, a fixed field winding surounding a part of said body portion and separated from each of said armature windings, and means for energizing said windings to create current flows in opposite directions in said armature windings and a current flow in the field winding alternately in the direction of current flow in each of said armature windings, said means comprising an electrical connection between the adjacent ends of said armature windings, an electric power circuit, an electrical connection from the other end of one of said armature windings to one side of said power circuit, a connection from the other side of the second of said armature windings to the other side of said power circuit, said last mentioned connection having a divided terminal portion, and connections from said divided terminal portion to said field winding.

Signed at New York, in the county of New York and State of New York, this 20th day of August, A. D. 1925.

EDWARD G. PARVIN.